(12) United States Patent
Yashiki et al.

(10) Patent No.: US 12,421,568 B2
(45) Date of Patent: *Sep. 23, 2025

(54) NON-ORIENTED ELECTRICAL STEEL SHEET AND METHOD OF MANUFACTURING THE SAME

(71) Applicant: NIPPON STEEL CORPORATION, Tokyo (JP)

(72) Inventors: Hiroyoshi Yashiki, Tokyo (JP); Yoshiaki Natori, Tokyo (JP); Miho Tomita, Tokyo (JP); Kazutoshi Takeda, Tokyo (JP); Takuya Matsumoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 461 days.

This patent is subject to a terminal disclaimer.

(21) Appl. No.: 17/918,567

(22) PCT Filed: Apr. 16, 2021

(86) PCT No.: PCT/JP2021/015700
§ 371 (c)(1),
(2) Date: Oct. 13, 2022

(87) PCT Pub. No.: WO2021/210672
PCT Pub. Date: Oct. 21, 2021

(65) Prior Publication Data
US 2023/0137498 A1    May 4, 2023

(30) Foreign Application Priority Data
Apr. 16, 2020 (JP) ................................. 2020-073211

(51) Int. Cl.
| | | |
|---|---|---|
| C21D 9/46 | (2006.01) | |
| C21D 8/12 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/08 | (2006.01) | |
| C22C 38/12 | (2006.01) | |
| C22C 38/14 | (2006.01) | |
| C22C 38/16 | (2006.01) | |
| C22C 38/60 | (2006.01) | |

(52) U.S. Cl.
CPC ............. *C21D 9/46* (2013.01); *C21D 8/1222* (2013.01); *C21D 8/1233* (2013.01); *C21D 8/1261* (2013.01); *C21D 8/1272* (2013.01); *C21D 8/1283* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/60* (2013.01)

(58) Field of Classification Search
None
See application file for complete search history.

(56) References Cited

U.S. PATENT DOCUMENTS

| | | |
|---|---|---|
| 6,139,650 A | 10/2000 | Oda et al. |
| 2006/0124207 A1 | 6/2006 | Takashima et al. |
| 2020/0040423 A1 | 2/2020 | Natori et al. |

FOREIGN PATENT DOCUMENTS

| | | |
|---|---|---|
| CN | 101310034 A | 11/2008 |
| CN | 110573643 A | 12/2019 |
| JP | H11-092891 A | 4/1999 |
| JP | 2004-300535 A | 10/2004 |
| JP | 2007-186791 A | 7/2007 |
| JP | 2012-140676 A | 7/2012 |
| KR | 10-2019-0127964 A | 11/2019 |
| TW | 201908498 A | 3/2019 |

*Primary Examiner* — Jenny R Wu
(74) *Attorney, Agent, or Firm* — SOLARIS Intellectual Property Group, PLLC

(57) ABSTRACT

A non-oriented electrical steel sheet including a base metal that has a chemical composition including, in mass %, C: 0.0010 to 0.0040%, Si: 3.5 to 4.9%, Mn: 0.05 to 0.20%, Al: 0.05 to 0.45%, P: 0.030% or less, S: 0.0030% or less, N: 0.0030% or less, O: 0.0100 to 0.0400%, Ca: less than 0.0010%, Ti: less than 0.0050%, Nb: less than 0.0050%, Zr: less than 0.0050%, V: less than 0.0050%, Cu: less than 0.20%, Ni: less than 0.50%, Sn: 0 to 0.05%, Sb: 0 to 0.05%, and a balance: Fe and impurities, and satisfying [4.0≤Si+Al≤5.0], in which the base metal has an O content of less than 0.0050% in a region excluding a portion from a surface of the base metal to a position of 10 μm in a depth direction of the base metal.

11 Claims, No Drawings

NON-ORIENTED ELECTRICAL STEEL SHEET AND METHOD OF MANUFACTURING THE SAME

TECHNICAL FIELD

The present disclosure relates to a non-oriented electrical steel sheet and a method of manufacturing the same.

BACKGROUND ART

In recent years, global environmental issues have attracted attention, and demands for energy saving efforts have further increased. Above all, there is a strong demand for higher efficiency of electric equipment. For this reason, there is a further increasing demand for enhancement in magnetic properties in a non-oriented electrical steel sheet widely used as an iron core material for a motor, a generator, or the like. This tendency is remarkable in drive motors for electric vehicles and hybrid vehicles and compressor motors for air conditioners.

A motor core of various motors as described above includes a stator as a stationary part and a rotor as a rotating part. The properties required for the stator and the rotor included in the motor core are different from each other. The stator is required to have excellent magnetic properties (low iron loss and high magnetic flux density), particularly low iron loss, whereas the rotor is required to have excellent mechanical properties (high strength).

Since properties required for the stator and the rotor are different, desired properties can be achieved by producing a non-oriented electrical steel sheet for the stator and another non-oriented electrical steel sheet for the rotor. However, preparing two types of non-oriented electrical steel sheets adversely causes a decrease in yield. Therefore, a non-oriented electrical steel sheet having excellent strength and also having excellent magnetic properties has been conventionally studied in order to achieve low iron loss while achieving high strength required for the rotor.

For example, attempts have been made to achieve excellent magnetic properties and high strength in Patent Documents 1 to 3. In Patent Document 4, an attempt has been made to achieve a high magnetic flux density and a low iron loss in a wide frequency range.

Patent Document 1: Japanese Patent Application Laid-Open (JP-A) No. 2004-300535
Patent Document 2: JP-A No. 2007-186791
Patent Document 3: JP-A No. 2012-140676
Patent Document 4: JP-A No. H11-092891

SUMMARY OF INVENTION

Technical Problem

However, reduction in iron loss for a stator material has been insufficient in the techniques disclosed in Patent Documents 1 to 3 for achieving energy saving properties that have been recently required for a motor of an electric vehicle or a hybrid vehicle. In addition, strength is not considered in the technique disclosed in Patent Document 4.

The present disclosure has been made to solve such a problem, and an object of the disclosure is to stably obtain a non-oriented electrical steel sheet having high strength and excellent magnetic properties at low cost.

Solution to Problem

The gist of the present disclosure is a non-oriented electrical steel sheet and a method of manufacturing the same described below.

(1) A non-oriented electrical steel sheet including a base metal that has a chemical composition including, in mass %,
C: 0.0010 to 0.0040%,
Si: 3.5 to 4.9%,
Mn: 0.05 to 0.20%,
Al: 0.05 to 0.45%,
P: 0.030% or less,
S: 0.0030% or less,
N: 0.0030% or less,
O: 0.0100 to 0.0400%,
Ca: less than 0.0010%,
Ti: less than 0.0050%,
Nb: less than 0.0050%,
Zr: less than 0.0050%,
V: less than 0.0050%,
Cu: less than 0.20%,
Ni: less than 0.50%,
Sn: 0 to 0.05%, and
Sb: 0 to 0.05%,
a balance being Fe and impurities,
wherein the following Formula (i) is satisfied:

$$4.0 \leq Si+Al \leq 5.0 \qquad \text{Formula (i):}$$

wherein each element symbol in Formula (i) represents a content (mass %) of a corresponding element in the base metal, and
wherein the base metal has an O content of less than 0.0050% in a region excluding a portion from a surface of the base metal to a position of 10 μm in a depth direction of the base metal.

(2) The non-oriented electrical steel sheet according to (1) having a tensile strength of 600 MPa or more.

(3) The non-oriented electrical steel sheet according to (1) or (2) having an insulation coating on the surface of the base metal.

(4) A method of manufacturing the non-oriented electrical steel sheet according to any one of (1) to (3),
the method including a hot rolling step, a cold rolling step, and a finish-annealing step with a soaking temperature of 750 to 1050° C., a soaking time of 1 to 300 seconds, and a dew point of 0 to 50° C.,
wherein the hot rolling step, the cold rolling step, and the finish-annealing step are sequentially performed on a steel ingot having a chemical composition including, in mass %,
C: 0.0020 to 0.0060%,
Si: 3.5 to 4.9%,
Mn: 0.05 to 0.20%,
Al: 0.05 to 0.45%,
P: 0.030% or less,
S: 0.0030% or less,
N: 0.0030% or less,
O: less than 0.0050%,
Ca: less than 0.0010%,
Ti: less than 0.0050%,
Nb: less than 0.0050%,
Zr: less than 0.0050%,
V: less than 0.0050%,
Cu: less than 0.20%,
Ni: less than 0.50%,
Sn: 0 to 0.05%, and
Sb: 0 to 0.05%,
a balance being Fe and impurities,
wherein the following Formula (i) is satisfied:

$$4.0 \leq Si+Al \leq 5.0 \qquad \text{Formula (i):}$$

wherein each element symbol in Formula (i) represents a content (mass %) of a corresponding element in the steel ingot.

(5) The method of manufacturing the non-oriented electrical steel sheet according to (4), further including a hot-rolled sheet annealing step between the hot rolling step and the cold rolling step.

Advantageous Effects of Invention

According to the present disclosure, a non-oriented electrical steel sheet having high strength and excellent magnetic properties can be stably obtained at low cost.

DESCRIPTION OF EMBODIMENTS

Intensive studies have been made by inventors of the present disclosure in order to solve the above problem, whereby the following findings have been obtained.

In a case in which higher strength of a steel is desired to be attained, a method of incorporating a large amount of an alloy element such as Cu, Ni, Ti, or V is often performed. However, in a case in which a large amount of the alloy element such as Cu, Ni, Ti, or V is incorporated, not only the cost is increased but also the magnetic properties are deteriorated.

Utilizing Si and Al is effective in order to attain the higher strength without incorporating an expensive alloy element as much as possible. In addition, it is necessary to improve high-frequency iron loss in order to enhance the magnetic properties of a non-oriented electrical steel sheet. The iron loss mainly includes hysteresis loss and eddy current loss. Si and Al also have an effect of increasing the electrical resistance of a steel to reduce the eddy current loss.

However, an increase in the Si content deteriorates the toughness and leads to embrittlement cracking during cold rolling, thereby causing a problem that manufacturing becomes difficult. As a countermeasure for this problem, it is conceivable to strengthen the grain boundary by segregating C at the crystal grain boundary in order to suppress embrittlement cracking during cold rolling. However, C precipitates as a carbide in a usage environment, which hinders domain wall displacement and results in increasing hysteresis loss.

Therefore, although C is incorporated to some extent at the time of cold rolling, it is desired to perform decarburization thereafter to reduce the C content in a final product. This makes it possible to achieve both enhancement in cold workability and reduction in the iron loss.

The content of Mn, which has a relatively low contribution to higher strength and the effect of increasing electric resistance, is reduced.

The present disclosure has been made based on the above findings. Hereinafter, each requirement of the present disclosure will be described in detail.

In the present disclosure, a numerical range represented by "to" means a range including numerical values described before and after "to" as a lower limit value and an upper limit value.

A numerical range in a case in which "greater than" or "less than" is attached to a numerical value described before and after "to" means a range not including these numerical values as a lower limit value or an upper limit value.

The term "step" includes not only an independent step, but also a step as long as the intended purpose of the step is achieved even if the step cannot be clearly distinguished from other steps.

In numerical ranges described in stages in the present disclosure, the upper limit value described in one numerical range may be replaced with the upper limit value of the numerical range described in another stage, or the lower limit value described in one numerical range may be replaced with the lower limit value of the numerical range described in another stage.

In a numerical range described in the present disclosure, the upper limit value or the lower limit value of the numerical range may be replaced with a value shown in Examples.

In the present disclosure, a combination of preferred embodiments is a more preferred embodiment.

1. Overall Configuration

A non-oriented electrical steel sheet according to the present disclosure has high strength and excellent magnetic properties and is thereby suitable for both a stator and a rotor. The non-oriented electrical steel sheet according to the present disclosure preferably includes an insulation coating on a surface of a base metal described below.

2. Chemical Composition of Base Metal

The reasons for limiting elements are as follows. Note that, in the following description, "%" for a content means "% by mass".

C: 0.0010 to 0.0040%

C (carbon) is an element that causes iron loss deterioration. If the C content exceeds 0.0040%, iron loss deterioration occurs in the non-oriented electrical steel sheet, and favorable magnetic properties cannot be obtained. However, C is an element that is effective for higher strength of the steel sheet. Therefore, the C content is set to 0.0010 to 0.0040%. The C content is preferably 0.0012% or more, and more preferably 0.0015% or more. The C content is preferably 0.0035% or less, and more preferably 0.0030% or less.

Si: 3.5 to 4.9%

Si (silicon) is an element that increases the electrical resistance of a steel to reduce the eddy current loss and improve the high-frequency iron loss. Si is an element that is also effective for higher strength of the steel sheet because Si has a high solid-solution strengthening ability. However, if the Si content is excessive, workability is significantly deteriorated, and cold rolling is hardly carried out. Therefore, the Si content is set to 3.5 to 4.9%. The Si content is preferably 3.6% or more, and more preferably 3.7% or more. The Si content is also preferably 4.8% or less, and more preferably 4.7% or less.

Mn: 0.05 to 0.20%

Although Mn (manganese) has an effect of increasing the electrical resistance of a steel to reduce the eddy current loss and improve the high-frequency iron loss, the effect is less than that of Si and Al. On the other hand, the magnetic flux density decreases as the Mn content increases. However, Mn has an effect of suppressing embrittlement during hot rolling due to S that is inevitably contained in a steel. Therefore, the Mn content is set to 0.05 to 0.20%. The Mn content is preferably 0.06 to 0.19% or less, and more preferably 0.07 to 0.18% or less.

Al: 0.05 to 0.45%

Al (aluminum) is an element that has an effect of increasing the electrical resistance of a steel, thereby reducing the eddy current loss and improving the high-frequency iron loss. In addition, Al is an element that contributes to higher strength by solid solution strengthening although not as much as Si. However, in the case of a high-Si steel such as a steel having a Si content of 3.5% or more, toughness is significantly deteriorated if the Al content is excessive, which leads to embrittlement cracking during cold rolling. Therefore, the Al content is set to 0.05 to 0.45%. The Al content is preferably 0.10% or more, and more preferably 0.15% or more. The Al content is also preferably 0.40% or less, more preferably 0.38% or less, and still more preferably 0.35% or less.

In the present disclosure, the electrical resistance of a steel is ensured by appropriately controlling the contents of Si and Al. This appropriate controlling is also required from the viewpoint of securing strength and toughness. Therefore, the contents of Si and Al are required to satisfy Formula (i) described below in addition to the contents of Si and Al each being within the above-described range. A value of Si+sol. Al is preferably 4.2 or more, and preferably 4.8 or less.

$$4.0 \leq Si+Al \leq 5.0 \quad \text{Formula (i):}$$

Wherein each element symbol in Formula (i) represents a content (mass %) of a corresponding element.

P: 0.030% or Less

P (phosphorus) is contained in a steel as an impurity. If the content of P is excessive, the toughness of the steel sheet is significantly lowered. Therefore, the P content is set to 0.030% or less. The P content is preferably 0.025% or less, and more preferably 0.020% or less. Extreme reduction in the P content may lead to an increase in manufacturing cost, and therefore, the P content may be 0.005% or more, 0.008% or more, or 0.010% or more.

S: 0.0030% or Less

S (sulfur) is an element that forms fine precipitates of MnS, thereby increasing the iron loss and deteriorating the magnetic properties of the steel sheet. Therefore, the S content is set to 0.0030% or less. The S content is preferably 0.0025% or less, and more preferably 0.0020% or less. Extreme reduction in the S content may lead to an increase in manufacturing cost, and therefore, the S content may be 0.0001% or more, 0.0003% or more, or 0.0005% or more.

N: 0.0030% or Less

N (nitrogen) is an element that inevitably mixed and that forms a nitride, thereby increasing the iron loss and deteriorating the magnetic properties of the steel sheet. Therefore, the N content is set to 0.0030% or less. The N content is preferably 0.0025% or less, and more preferably 0.0020% or less. Extreme reduction in the N content may lead to an increase in manufacturing cost, and therefore, the N content may be 0.0005% or more.

O: 0.0100 to 0.0400%

O (oxygen) is an element that inevitably mixed and is an element that forms an oxide, thereby increasing the iron loss and deteriorating the magnetic properties of the steel sheet. Therefore, it is preferable that the O content is low. However, it is difficult to reduce the content of O because O forms an oxide layer on a surface layer during decarburization. In this regard, excessive oxidation of a surface layer of the base metal also causes deterioration of the magnetic flux density. Therefore, the average content of O in the total thickness of the base metal is set to 0.0100 to 0.0400%. The O content is preferably 0.0350% or less, and more preferably 0.0300% or less.

Although formation of an oxide layer on a surface layer of the base metal is inevitable as mentioned above, it is desirable to reduce the O content in a region excluding the surface layer as much as possible. Specifically, it is necessary to set the O content to less than 0.0050% in a region excluding a portion from the surface of the base metal to a position of 10 μm in a depth direction of the base metal. Oxygen in the central portion of the base metal at a depth of 10 μm or more from the surface of the base metal is considered to be oxygen contained in an oxide formed during solidification in a steelmaking process. That is, in a case in which the surface layer portion is oxidized by controlling the dew point in a finish-annealing step, the internal oxidation occurs within about several μm depth from the surface of the base metal, and the O content at a depth of 10 μm or more from the surface of the base metal corresponds to that during steelmaking. If this amount of oxygen is 0.0050% or more, a large amount of an oxide of the base metal is formed, and the hysteresis loss increases. Therefore, the O content in a region excluding a portion from the surface of the base metal to a position of 10 μm in the depth direction of the base metal is less than 0.0050%. The O content in a region excluding a portion from the surface of the base metal to a position of 10 μm in the depth direction of the base metal is preferably 0.0045% or less, and more preferably 0.0040% or less.

The O content in a region excluding a portion from the surface of the base metal to a position of 10 μm in the depth direction of the base metal can be measured by an inert gas fusion-non-dispersive infrared absorption method after removing regions that are from the front surface of the base metal to a position of 10 μm depth and from the back surface of the base metal to a position of 10 μm depth of the base metal by chemical polishing using a mixed aqueous solution of hydrofluoric acid and hydrogen peroxide water.

Ca: Less than 0.0010%

Ca (calcium) is added as a desulfurization agent at a steelmaking stage. Ca remaining in the base metal binds to S to form a Ca-based sulfide. This sulfide may be coarsely precipitated, thereby deteriorating the fatigue strength of a product. Adding a large amount of Ca is therefore unnecessary, and it also increases the cost. Therefore, the Ca content is less than 0.0010%. The Ca content is preferably 0.0008% or less, and more preferably 0.0005% or less. Extreme reduction in the Ca content may lead to an increase in manufacturing cost, and therefore, the Ca content may be 0.0001% or more.

Ti: Less than 0.0050%

Ti (titanium) is an element that is inevitably mixed, and may bind to carbon or nitrogen to form precipitates (carbides or nitrides). The precipitates themselves deteriorate the magnetic properties in a case in which the carbides or nitrides are formed. Furthermore, the growth of crystal grains during finish annealing is inhibited, whereby the magnetic properties are deteriorated. Therefore, the Ti content is set to less than 0.0050%. The Ti content is preferably 0.0040% or less, more preferably 0.0030% or less, and still more preferably 0.0020% or less. Extreme reduction in the Ti content may lead to an increase in manufacturing cost, and therefore, the Ti content may be 0.0005% or more.

Nb: Less than 0.0050%

Nb (niobium) is an element that contributes to the higher strength by binding to carbon or nitrogen to form precipitates (carbides), but these precipitates themselves deteriorate the magnetic properties. Therefore, the Nb content is set to less than 0.0050%. The Nb content is preferably 0.0040% or less, more preferably 0.0030% or less, and still more preferably 0.0020% or less. The Nb content is preferably as low as possible, and is preferably equal to or less than the measurement limit.

Zr: Less than 0.0050%

Zr (zirconium) is an element that contributes to the higher strength by binding to carbon or nitrogen to form precipitates (carbides, nitrides), but these precipitates themselves deteriorate the magnetic properties. Therefore, the Zr content is set to less than 0.0050%. The Zr content is preferably 0.0040% or less, more preferably 0.0030% or less, and still more preferably 0.0020% or less. The Zr content is preferably as low as possible, and is preferably equal to or less than the measurement limit.

V: Less than 0.0050%

V (vanadium) is an element that contributes to the higher strength by binding to carbon or nitrogen to form precipitates (carbides, nitrides), but these precipitates themselves deteriorate the magnetic properties. Therefore, the V content is set to less than 0.0050%. The V content is preferably 0.0040% or less, more preferably 0.0030% or less, and still more preferably 0.0020% or less. The V content is preferably as low as possible, and is preferably equal to or less than the measurement limit.

Cu: Less than 0.20%

Cu (copper) is an element that is inevitably mixed. The intentional addition of Cu increases manufacturing cost of the steel sheet. Therefore, Cu is not required to be voluntarily added and may be an impurity level in the present disclosure. The Cu content is set to less than 0.20%, which is the maximum value that can be inevitably mixed in a manufacturing process. The Cu content is preferably 0.15% or less, and more preferably 0.10% or less. The lower limit value of the Cu content is not particularly limited, but extreme reduction in the Cu content may lead to an increase in manufacturing cost. Therefore, the Cu content may be 0.001% or more, 0.003% or more, or 0.005% or more.

Ni: Less than 0.50%

Ni (nickel) is an element that is inevitably mixed. However, Ni is also an element that enhances the strength of the steel sheet, and therefore, Ni may be intentionally added. In this regard, since Ni is expensive, the content of Ni is set to less than 0.50% in a case in which Ni is intentionally added. The Ni content is preferably 0.40% or less, and more preferably 0.30% or less. The lower limit value of the Ni content is not particularly limited, but extreme reduction in the Ni content may lead to an increase in manufacturing cost. Therefore, the Ni content may be 0.001% or more, 0.003% or more, or 0.005% or more.

Sn: 0 to 0.05%

Sb: 0 to 0.05%

Sn (tin) and Sb (antimony) are elements that are useful for securing low iron loss by segregating on the surface and suppressing oxidation and nitriding during annealing. Sn and Sb also have an effect of segregating at the crystal grain boundary to improve the texture and to increase the magnetic flux density. Therefore, at least one of Sn or Sb may be incorporated, if necessary. However, if the content of Sn or Sb element is excessive, the toughness of a steel may be reduced, whereby cold rolling may be difficult. Therefore, the contents of Sn and Sb are each 0.05% or less. The contents of Sn and Sb are each preferably 0.03% or less. The content of at least one of Sn or Sb is preferably 0.005% or more, and more preferably 0.01% or more, in a case in which the above effect is desired to be obtained.

In a chemical composition of the base metal of the non-oriented electrical steel sheet of the present disclosure, a balance is Fe and impurities. In this regard, the term "impurities" means components that are mixed due to raw materials such as ore and scrap, and various factors of a manufacturing process when a steel is industrially manufactured, and that are acceptable within a range not adversely affecting the effect of the present disclosure.

The contents of Cr and Mo as impurity elements are not particularly limited. Even if these elements are contained at 0.5% or less, the effect of the present disclosure is not particularly affected in the non-oriented electrical steel sheet according to the present disclosure. Even if Mg is contained in a range of 0.002% or less, the effect of the present disclosure is not particularly affected. Even if a rare earth element (REM) is contained in a range of 0.004% or less, the effect of the present disclosure is not particularly affected. REM is a generic term for 17 elements in total, which are Sc, Y, and lanthanoids. The content of REM refers to the total content of one or more elements of REM.

In addition to the above elements, elements such as Pb, Bi, As, B, and Se may be contained, and the effect of the present disclosure is not impaired as long as the content of each element is in a range of 0.0050% or less.

3. Magnetic Properties

In the non-oriented electrical steel sheet according to the present disclosure, excellent magnetic properties mean that the iron loss $W_{10/400}$ is low and the magnetic flux density $B_{50}$ is high. In this regard, the magnetic properties are measured by an Epstein method defined in JIS C 2550-1 (2011). In a case in which measurement by an Epstein method is difficult, for example, a test piece is too small, measurement may be performed by correcting a measurement value to be equivalent to a measurement value of an Epstein method according to a single sheet magnetic property measurement method (Single Sheet Tester: SST) defined in JIS C 2556 (2015). In the present disclosure, a low iron loss $W_{10/400}$ means that the iron loss is 30.0 W/kg or less for a sheet thickness of 0.26 mm or more, 22.0 W/kg or less for a sheet thickness of 0.21 to 0.25 mm, and 18.0 W/kg or less for a sheet thickness of 0.20 mm or less. A high magnetic flux density $B_{50}$ means that the magnetic flux is 1.60 T or more regardless of the sheet thickness.

4. Mechanical Properties

In the non-oriented electrical steel sheet according to the present disclosure, having high strength means that the tensile strength is preferably 600 MPa or more. The tensile strength is more preferably 610 MPa or more, and still more preferably 630 MPa or more. In this regard, the tensile strength is measured by performing a tensile test in accordance with JIS Z 2241 (2011).

5. Insulation Coating

In the non-oriented electrical steel sheet according to the present disclosure, it is preferable that an insulation coating is formed on the surface of the base metal as mentioned above. The non-oriented electrical steel sheets are layered and used after a core blank is punched out, and therefore, providing an insulation coating on the surface of the base metal can reduce the eddy current between the sheets and makes it possible to reduce the eddy current loss as a core.

The type of the insulation coating is not particularly limited, and a known insulation coating used as an insulation coating for a non-oriented electrical steel sheet can be used. Examples of such an insulation coating include a composite insulation coating mainly containing an inorganic substance and further containing an organic substance. In this regard, the composite insulation coating is an insulation coating that has fine organic resin particles dispersed therein and that mainly contains at least any one of inorganic substances, for example, a chromate metal salt, a phosphate metal salt, and colloidal silica, a Zr compound, and a Ti compound. In particular, an insulation coating employing a metal phosphate salt, a coupling agent with Zr or Ti, or a carbonate or ammonium salt thereof as a starting material is preferably used from the viewpoint of reducing the environmental load during manufacturing, which has been increasingly required in recent years.

Here, the amount of adhesion of the insulation coating is not particularly limited, but is, for example, preferably about 200 to 1500 mg/m$^2$ per one surface, and more preferably 300 to 1200 mg/m$^2$ per one surface. Excellent uniformity can be maintained by forming the insulation coating so as to have the amount of adhesion in the above range. For the case of measuring the amount of adhesion of the insulation coating afterwards, various known measurement methods can be used, and for example, a method of measuring a mass difference before and after immersion in an aqueous sodium hydroxide solution, a fluorescent X-ray method using a calibration curve method, or the like may be appropriately used.

6. Method of Manufacturing

A method of manufacturing the non-oriented electrical steel sheet according to the disclosure will be described. The non-oriented electrical steel sheet according to the disclosure can be manufactured by sequentially performing a hot rolling step, a cold rolling step, and a finish-annealing step with a soaking temperature of 750 to 1050° C., a soaking time of 1 to 300 seconds, and a dew point of 0 to 50° C. on a steel ingot having a chemical composition that includes, in mass %, C: 0.0020 to 0.0060%, Si: 3.5 to 4.9%, Mn: 0.05 to 0.20%, Al: 0.05 to 0.45%, P: 0.030% or less, S: 0.0030% or less, N: 0.0030% or less, O: less than 0.0050%, Ca: less than 0.0010%, Ti: less than 0.0050%, Nb: less than 0.0050%, Zr: less than 0.0050%, V: less than 0.0050%, Cu: less than 0.20%, Ni: less than 0.50%, Sn: 0 to 0.05%, Sb: 0 to 0.05%, and a balance: Fe and impurities, and satisfies the above-described formula (i). A hot-rolled sheet annealing step may be further provided between the hot rolling step and the cold rolling step. In a case in which the insulation coating is formed on the surface of the base metal, the insulation coating is formed after the finish annealing. Hereinafter, each step will be described in detail.

<Chemical Composition of Steel Ingot>

Because the chemical composition of the steel ingot is the same as the chemical composition of the steel sheet except for C and O, the description thereof is omitted. The reasons for limitation of C and O will be described below.

C: 0.0020 to 0.0060%

C has an effect of suppressing embrittlement cracking during cold rolling by segregating at grain boundaries. The C content in the steel ingot is preferably 0.0020% or more in order to obtain this effect. However, if excessive C is contained in a final product, favorable magnetic properties cannot be obtained as mentioned above. In the present disclosure, decarburization is performed in the finish-annealing step to reduce the C content in the final product. However, if the C content in the steel ingot exceeds 0.0060%, it is difficult to control the C content in the final product to 0.0040% or less. Therefore, the C content in the steel ingot is preferably 0.0020 to 0.0060%, more preferably 0.0025 to 0.0055%, and still more preferably 0.0030 to 0.0050%.

O: Less than 0.0050%

O is an element that inevitably mixed and forms an oxide, thereby increasing the iron loss and deteriorating the magnetic properties of the steel sheet. The O content in the steel ingot is preferably less than 0.0050% in order to make the O content in a region excluding a portion from the surface of the base metal to a position of 10 µm in the depth direction of the base metal less than 0.0050% in the final product as mentioned above.

<Hot Rolling Step>

The steel ingot (slab) having the above-described chemical composition is heated, and the heated steel ingot is hot-rolled to obtain a hot-rolled sheet. Here, the heating temperature for the steel ingot at the time of subjecting the steel ingot to the hot rolling is not particularly limited, but is preferably, for example, 1050 to 1250° C. The thickness of the hot-rolled sheet after the hot rolling is not particularly limited, but is preferably, for example, about 1.5 to 3.0 mm in consideration of the final thickness of the base metal.

<Hot-Rolled Sheet Annealing Step>

Thereafter, hot-rolled sheet annealing is carried out, if necessary, for the purpose of increasing the magnetic flux density of the steel sheet. Heat treatment conditions in the hot-rolled sheet annealing are not particularly specified, but for example, heating at a temperature of 950° C. or lower is preferable. Heating time is preferably 1 to 300 seconds. The hot-rolled sheet annealing step may be omitted for cost reduction although the magnetic properties are inferior to those in the case of carrying out the hot-rolled sheet annealing step.

<Pickling Step>

After the hot-rolled sheet annealing, pickling is carried out to remove a scale layer generated on the surface of the base metal. Here, pickling conditions such as the concentration of an acid used for the pickling, the concentration of a promotor used for the pickling, and the temperature of a pickling liquid are not particularly limited, and known pickling conditions can be used.

<Cold Rolling Step>

After the pickling, cold rolling is carried out. In the cold rolling, the pickled sheet from which the scale layer has been removed is rolled at a rolling reduction ratio such that the final sheet thickness of the base metal becomes 0.10 to 0.35 mm.

<Finish-Annealing Step>

After the cold rolling, finish annealing is carried out. In the method of manufacturing the non-oriented electrical steel sheet according to the present disclosure, a continuous annealing furnace is used for the finish annealing. The finish-annealing step is an important step for performing decarburization and controlling the C content and the crystal grain size in the base metal.

Regarding finish-annealing conditions, it is preferable that the soaking temperature is 750 to 1050° C., the soaking time is 1 to 300 seconds, the atmosphere is a mixed atmosphere of $H_2$ and $N_2$ (i.e., $H_2+N_2=100$ vol %) in which the proportion of $H_2$ is 10 to 100 vol %, and the dew point of the atmosphere is 0 to 50° C.

In a case in which the soaking temperature is lower than 750° C., the crystal grain size becomes small, the ratio of the non-recrystallized region increases, and the iron loss is deteriorated, which is not preferable. In a case in which the soaking temperature exceeds 1050° C., the strength becomes insufficient, and the iron loss is also deteriorated, which is not preferable. The soaking temperature is more preferably 770 to 1020° C., and still more preferably 800 to 1000° C. The proportion of $H_2$ in the atmosphere is more preferably 15 to 90 vol %. The decarburization can be sufficiently performed by setting the dew point of the atmosphere to 0° C. or higher, whereby the C content in the base metal can be reduced. Excessive oxidation of the surface of the base metal can be suppressed by setting the dew point of the atmosphere to 50° C. or lower. The dew point of the atmosphere is more preferably 10 to 40° C., and still more preferably 15 to 35° C.

<Insulation Coating Forming Step>

After the finish annealing, a step of forming an insulation coating is carried out, if necessary. In this regard, the step of forming an insulation coating is not particularly limited, and using the known insulation film treatment liquid as described above, application of the treatment liquid and drying may be performed by a known method.

The surface of the base metal on which an insulation coating will be formed may be subjected to an arbitrary pretreatment such as a degreasing treatment with alkali or the like or a pickling treatment with hydrochloric acid, sulfuric acid, phosphoric acid, or the like before applying the treatment liquid, or may be a surface as it is after the finish annealing without being subjected to these pretreatments.

Hereinafter, the present disclosure will be described more specifically with reference to examples, but the present disclosure is not limited to these examples.

EXAMPLES

A slab having a chemical composition shown in Table 1 was heated to 1150° C., then hot-rolled at a finishing temperature of 850° C. and a finishing sheet thickness of 2.0 mm, and wound up at 650° C. to obtain a hot-rolled steel sheet. In Test Nos. 1 to 18 and 20 to 25 shown in Table 2, a hot-rolled steel sheet obtained was subjected to hot-rolled sheet annealing at 900° C.×40 seconds with a continuous annealing furnace, and scale on the surface was removed by pickling. In Test No. 19 shown in Table 2, scale on the surface of the hot-rolled steel sheet obtained was removed by pickling, and then, hot-rolled sheet annealing was omitted. The steel sheet thus obtained was cold-rolled into a cold-rolled sheet having a sheet thickness of 0.25 mm.

Annealing was further performed in a mixed atmosphere of $H_2$: 20% and $N_2$: 80% with various finish-annealing conditions (soaking temperature, soaking time, and dew point) so as to obtain chemical compositions as shown in Table 2 below. The dew point was raised for a case in which the C content was controlled to be low. The dew point was lowered for a case in which the C content was controlled so as not to be changed. Thereafter, an insulation coating was applied to manufacture a non-oriented electrical steel sheet, and the sheet was used as a test specimen.

The insulation coating was formed by applying an insulation coating including aluminum phosphate and an acryl-styrene copolymer resin emulsion having a particle size of 0.2 μm so as to obtain a predetermined amount of adhesion, and baking the insulation coating at 350° C. in the air.

TABLE 1

| Steel type | Chemical composition of steel ingot (mass %, balance: Fe and impurities) | | | | | | | | | |
|---|---|---|---|---|---|---|---|---|---|---|
| | C | Si | Mn | Al | P | S | N | O | Ca | Ti |
| A | 0.0035 | 3.4 | 0.16 | 0.50 | 0.014 | 0.0009 | 0.0015 | 0.0029 | 0.0005 | 0.0014 |
| B | 0.0035 | 3.7 | 0.16 | 0.35 | 0.015 | 0.0010 | 0.0015 | 0.0030 | 0.0005 | 0.0015 |
| C | 0.0038 | 4.1 | 0.15 | 0.30 | 0.014 | 0.0008 | 0.0013 | 0.0028 | 0.0004 | 0.0012 |
| D | 0.0045 | 4.5 | 0.17 | 0.21 | 0.008 | 0.0009 | 0.0012 | 0.0025 | 0.0006 | 0.0014 |
| E | 0.0050 | 4.8 | 0.14 | 0.19 | 0.011 | 0.0012 | 0.0013 | 0.0020 | 0.0005 | 0.0012 |
| F | 0.0050 | 4.8 | 0.14 | 0.39 | 0.008 | 0.0010 | 0.0012 | 0.0020 | 0.0004 | 0.0010 |
| G | 0.0016 | 4.8 | 0.14 | 0.18 | 0.011 | 0.0011 | 0.0013 | 0.0022 | 0.0006 | 0.0011 |
| H | 0.0065 | 4.1 | 0.18 | 0.22 | 0.012 | 0.0009 | 0.0011 | 0.0025 | 0.0005 | 0.0013 |
| I | 0.0050 | 4.8 | 0.26 | 0.19 | 0.011 | 0.0010 | 0.0013 | 0.0021 | 0.0004 | 0.0012 |
| J | 0.0038 | 4.2 | 0.15 | 0.04 | 0.013 | 0.0008 | 0.0012 | 0.0035 | 0.0004 | 0.0011 |
| K | 0.0038 | 4.2 | 0.14 | 0.41 | 0.014 | 0.0009 | 0.0013 | 0.0028 | 0.0007 | 0.0010 |
| L | 0.0037 | 4.4 | 0.14 | 0.60 | 0.012 | 0.0009 | 0.0013 | 0.0025 | 0.0007 | 0.0010 |
| M | 0.0045 | 4.8 | 0.17 | 0.19 | 0.012 | 0.0005 | 0.0012 | 0.0026 | 0.0005 | 0.0012 |
| N | 0.0053 | 4.1 | 0.15 | 0.32 | 0.020 | 0.0015 | 0.0014 | 0.0028 | 0.0008 | 0.0013 |
| O | 0.0033 | 4.3 | 0.16 | 0.35 | 0.001 | 0.0008 | 0.0012 | 0.0025 | 0.0003 | 0.0014 |
| P | 0.0045 | 4.0 | 0.10 | 0.18 | 0.023 | 0.0016 | 0.0020 | 0.0033 | 0.0005 | 0.0013 |
| Q | 0.0036 | 3.9 | 0.18 | 0.29 | 0.016 | 0.0029 | 0.0018 | 0.0030 | 0.0008 | 0.0016 |
| R | 0.0035 | 4.5 | 0.18 | 0.48 | 0.016 | 0.0010 | 0.0018 | 0.0024 | 0.0005 | 0.0014 |
| S | 0.0042 | 3.6 | 0.15 | 0.40 | 0.014 | 0.0015 | 0.0020 | 0.0020 | 0.0003 | 0.0015 |
| T | 0.0040 | 3.6 | 0.17 | 0.30 | 0.012 | 0.0010 | 0.0019 | 0.0029 | 0.0006 | 0.0014 |
| U | 0.0036 | 3.4 | 0.16 | 0.45 | 0.015 | 0.0011 | 0.0015 | 0.0025 | 0.0005 | 0.0015 |

| Steel type | Chemical composition of steel ingot (mass %, balance: Fe and impurities) | | | | | | | Middle side value of Formula (i)† |
|---|---|---|---|---|---|---|---|---|
| | Nb | Zr | V | Cu | Ni | Sn | Sb | |
| A | 0.0008 | 0.0006 | 0.0009 | 0.060 | 0.032 | 0.030 | 0.001 | 3.9 |
| B | 0.0009 | 0.0006 | 0.0008 | 0.062 | 0.030 | 0.029 | 0.001 | 4.1 |
| C | 0.0008 | 0.0007 | 0.0008 | 0.035 | 0.023 | 0.025 | 0.001 | 4.4 |
| D | 0.0010 | 0.0009 | 0.0010 | 0.010 | 0.025 | 0.027 | 0.001 | 4.7 |
| E | 0.0009 | 0.0006 | 0.0009 | 0.015 | 0.035 | 0.020 | 0.001 | 5.0 |
| F | 0.0010 | 0.0007 | 0.0009 | 0.018 | 0.035 | 0.020 | 0.001 | 5.2 |
| G | 0.0008 | 0.0007 | 0.0008 | 0.015 | 0.030 | 0.021 | 0.001 | 5.0 |
| H | 0.0009 | 0.0008 | 0.0009 | 0.010 | 0.025 | 0.028 | 0.001 | 4.3 |
| I | 0.0008 | 0.0007 | 0.0009 | 0.016 | 0.035 | 0.020 | 0.001 | 5.0 |
| J | 0.0008 | 0.0006 | 0.0008 | 0.030 | 0.025 | 0.025 | 0.001 | 4.2 |
| K | 0.0007 | 0.0008 | 0.0010 | 0.055 | 0.032 | 0.035 | 0.001 | 4.6 |
| L | 0.0007 | 0.0008 | 0.0009 | 0.053 | 0.030 | 0.033 | 0.001 | 5.0 |

TABLE 1-continued

| | | | | | | | | |
|---|---|---|---|---|---|---|---|---|
| M | 0.0008 | 0.0008 | 0.0007 | 0.040 | 0.020 | 0.001 | 0.025 | 5.0 |
| N | 0.0010 | 0.0009 | 0.0008 | 0.010 | 0.020 | 0.032 | 0.001 | 4.4 |
| O | 0.0008 | 0.0008 | 0.0006 | 0.056 | 0.032 | 0.001 | 0.001 | 4.7 |
| P | 0.0009 | 0.0010 | 0.0009 | 0.057 | 0.036 | 0.023 | 0.001 | 4.2 |
| Q | 0.0007 | 0.0008 | 0.0006 | 0.009 | 0.011 | 0.018 | 0.001 | 4.2 |
| R | 0.0008 | 0.0008 | 0.0008 | 0.012 | 0.015 | 0.025 | 0.001 | 5.0 |
| S | 0.0010 | 0.0007 | 0.0010 | 0.062 | 0.036 | 0.020 | 0.001 | 4.0 |
| T | 0.0009 | 0.0010 | 0.0010 | 0.053 | 0.033 | 0.021 | 0.001 | <u>3.9</u> |
| U | 0.0010 | 0.0006 | 0.0010 | 0.031 | 0.025 | 0.022 | 0.001 | <u>3.9</u> |

†Formula (i): −4.0 ≤ Si + Al ≤ 5.0

The O content in a region excluding a portion from the surface of the base metal to a position of 10 μm in the depth direction of the base metal was measured by the method mentioned above.

Epstein test pieces were taken from the rolling direction and the widthwise direction in each test specimen, and the magnetic properties (iron loss $W_{10/400}$ and magnetic flux density $B_{50}$) were evaluated by an Epstein test in accordance with JIS C 2550-1 (2011). A JIS No. 5 tensile test piece was taken from each test specimen according to JIS Z 2241 (2011) so that the longitudinal direction coincided with the rolling direction of the steel sheet. A tensile test was then performed according to JIS Z 2241 (2011) using the test piece, and the tensile strength was measured. The results are shown in Table 2.

In Tables 1 and 2, underlines for chemical components mean being outside the ranges of the present disclosure, and underlines for other than the chemical components mean being outside the preferred ranges.

TABLE 2

| | | Finish-annealing condition | | | Chemical composition of base metal | | O content in region excluding portion from surface to position of 10 μm (mass %) | Test result | | | |
|---|---|---|---|---|---|---|---|---|---|---|---|
| Test No. | Steel type | Soaking temperature (° C.) | Soaking time (s) | Dew point (° C.) | C (mass %) | O (mass %) | | Tensile strength (MPa) | $W_{10/400}$ (W/kg) | $B_{50}$ (T) | |
| 1 | A | 850 | 15 | 20 | 0.0025 | 0.0260 | 0.0029 | <u>579</u> | 15.3 | 1.67 | Comparative example |
| 2 | B | 850 | 15 | 20 | 0.0026 | 0.0265 | 0.0030 | 606 | 14.6 | 1.66 | Example of invention |
| 3 | C | <u>740</u> | 15 | 25 | 0.0025 | 0.0283 | 0.0027 | 728 | <u>23.5</u> | 1.65 | Comparative example |
| 4 | | 900 | 15 | 25 | 0.0025 | 0.0283 | 0.0026 | 636 | 13.1 | 1.65 | Example of invention |
| 5 | | <u>1060</u> | 15 | 25 | 0.0028 | 0.0262 | 0.0020 | <u>595</u> | 11.3 | 1.64 | Comparative example |
| 6 | D | 950 | 30 | 30 | 0.0024 | 0.0293 | 0.0020 | 667 | 11.2 | 1.63 | Example of |
| 7 | E | 950 | 30 | 30 | 0.0029 | 0.0299 | 0.0023 | 702 | 11.0 | 1.61 | invention |
| 8 | F | | | | Fracture during cold rolling | | | | | | Comparative |
| 9 | G | | | | | | | | | | example |
| 10 | H | 800 | 15 | 30 | <u>0.0047</u> | 0.0300 | 0.0025 | 672 | <u>22.3</u> | 1.66 | |
| 11 | I | 1000 | 15 | 30 | 0.0030 | 0.0295 | 0.0021 | 692 | 11.3 | <u>1.59</u> | |
| 12 | J | 800 | 20 | 25 | 0.0025 | 0.0263 | 0.0034 | 673 | <u>22.5</u> | <u>1.65</u> | |
| 13 | K | 800 | 20 | 25 | 0.0026 | 0.0265 | 0.0025 | 695 | 15.7 | 1.64 | Example of invention |
| 14 | L | | | | Fracture during cold rolling | | | | | | Comparative example |
| 15 | M | 900 | 40 | 35 | 0.0020 | 0.0345 | 0.0026 | 719 | 12.6 | 1.60 | Example of invention |
| 16 | | 900 | 40 | <u>55</u> | 0.0015 | <u>0.0455</u> | 0.0025 | 716 | 12.9 | <u>1.59</u> | Comparative |
| 17 | N | 800 | 15 | <u>−10</u> | <u>0.0052</u> | 0.0030 | 0.0026 | 679 | <u>22.2</u> | 1.65 | example |
| 18 | | 800 | 15 | 30 | 0.0028 | 0.0312 | 0.0026 | 675 | 16.7 | 1.64 | Example of |
| 19 | O | 950 | 15 | 15 | 0.0026 | 0.0255 | 0.0025 | 651 | 11.3 | 1.62 | invention |
| 20 | P | 800 | 15 | 15 | 0.0039 | 0.0240 | 0.0030 | 655 | 18.3 | 1.65 | |
| 21 | Q | 800 | 10 | 25 | 0.0027 | 0.0270 | 0.0028 | 641 | 19.8 | 1.65 | |
| 22 | R | | | | Fracture during cold rolling | | | | | | Comparative |
| 23 | S | 800 | 15 | 25 | 0.0036 | 0.0310 | <u>0.0055</u> | 603 | <u>23.0</u> | 1.66 | example |
| 24 | T | 800 | 15 | 25 | 0.0035 | 0.0292 | 0.0028 | <u>592</u> | 21.5 | 1.67 | |
| 25 | U | 800 | 15 | 25 | 0.0030 | 0.0285 | 0.0026 | <u>590</u> | 21.2 | 1.67 | |

In Test Nos. 2, 4, 6, 7, 13, 15, 16, and 18 to 21, in which chemical compositions of the steel sheets and the soaking temperatures, soaking times, and dew points after the finish annealing satisfy the requirements of the present disclosure, it was found that the steel sheets each have an excellent iron loss and magnetic flux density, particularly have a low iron loss, and have a high tensile strength of 600 MPa or more.

On the other hand, in Test Nos. 1, 3, 5, 8 to 12, 14, 17, and 22 to 25, which are Comparative Examples, at least any one of the magnetic properties or the strength was poor, or the toughness was significantly deteriorated, whereby manufacturing was difficult.

Specifically, in Test No. 1, the Si content was lower than the specified range, the Al content was higher than the specified range, and the total of Si and Al contents is lower than the specified value of formula (i), which therefore resulted in poor tensile strength. Comparing Test Nos. 3 to 6 in which the chemical compositions satisfy the requirements, in Test No. 3, the soaking temperature of the finish annealing was lower than the specified range, which therefore resulted in poor iron loss, and in Test No. 5, the soaking temperature of the finish annealing was higher than the specified range, which therefore resulted in poor tensile strength.

Since the total of Si and Al contents is higher than the specified value of formula (i) in Test No. 8, the C content of the steel ingot was lower than the specified range in Test No. 9, and the Al content exceeded the specified range in Test No. 14, the toughness was therefore deteriorated, whereby fracture occurred during the cold rolling, and measurement of the tensile strength and magnetic properties could not be carried out. In Test No. 10, the C content of the base metal is high, which therefore resulted in poor iron loss. In Test No. 11, the Mn content is higher than the specified value, which therefore resulted in poor magnetic flux density. In Test No. 12, the Al content is lower than the specified value, which therefore resulted in poor iron loss.

In Test No. 17, the dew point of the finish annealing was below the specified range, and the C content of the base metal exceeded the specified range, which therefore resulted in poor iron loss.

In Test No. 22, the Al content exceeded the specified range, and the toughness was therefore deteriorated, whereby fracture occurred during the cold rolling, and measurement of the tensile strength and magnetic properties could not be carried out similarly to Test No. 14.

In Test No. 23, the O content in a region excluding a 10 μm surface layer of the steel sheet (base metal) exceeded the specified range, which therefore resulted in poor iron loss.

In Test No. 24, although the Si and Al contents were each within a specified range, the total of Si and Al contents was lower than the specified value of formula (i), which therefore resulted in poor tensile strength.

In Test No. 25, the Si content was lower than the specified value, and furthermore, the total of Si and Al contents was lower than the specified value of formula (i), which therefore resulted in poor tensile strength.

INDUSTRIAL APPLICABILITY

As described above, a non-oriented electrical steel sheet having high strength and excellent magnetic properties can be stably obtained at low cost according to the present disclosure.

The disclosure of Japanese Patent Application No. 2020-073211 filed on Apr. 16, 2020 is incorporated herein by reference in its entirety. All documents, patent applications, and technical standards described in this specification are incorporated herein by reference to the same extent as if individual document, patent application, and technical standard were specifically and individually described.

The invention claimed is:

1. A non-oriented electrical steel sheet comprising a base metal that has a chemical composition comprising, in mass %, C: 0.0010 to 0.0040%,
Si: 3.5 to 4.9%,
Mn: 0.05 to 0.19%,
Al: 0.05 to 0.45%,
P: 0.030% or less,
S: 0.0030% or less,
N: 0.0030% or less,
O: 0.0100 to 0.0400%,
Ca: less than 0.0010%,
Ti: less than 0.0050%,
Nb: less than 0.0050%,
Zr: less than 0.0050%,
V: less than 0.0050%,
Cu: less than 0.20%,
Ni: less than 0.50%,
Sn: 0 to 0.05%, and
Sb: 0 to 0.05%,
a balance being Fe and impurities,
wherein the following Formula (i) is satisfied:

$$4.0 \leq Si+Al \leq 5.0 \qquad \text{Formula (i):}$$

wherein each element symbol in Formula (i) represents a content (mass %) of a corresponding element in the base metal, and wherein the base metal has an O content (mass %) of less than 0.0050% in a region excluding a portion from a surface of the base metal to a position of 10 μm in a depth direction of the base metal.

2. The non-oriented electrical steel sheet according to claim 1, having a tensile strength of 600 MPa or more.

3. The non-oriented electrical steel sheet according to claim 2, having a tensile strength of 600 MPa or more.

4. The non-oriented electrical steel sheet according to claim 2, having an insulation coating on the surface of the base metal.

5. The non-oriented electrical steel sheet according to claim 2, wherein a magnetic flux density ($B_{50}$) is 1.60 T or more.

6. The non-oriented electrical steel sheet according to claim 1, having an insulation coating on the surface of the base metal.

7. The non-oriented electrical steel sheet according to claim 6, having an insulation coating on the surface of the base metal.

8. The non-oriented electrical steel sheet according to claim 6, wherein a magnetic flux density ($B_{50}$) is 1.60 T or more.

9. A method of manufacturing the non-oriented electrical steel sheet according to claim 1, the method comprising a hot rolling step, a cold rolling step, and a finish-annealing step with a soaking temperature of 750 to 1050° C., a soaking time of 1 to 300 seconds, and a dew point of 0 to 50° C., wherein the hot rolling step, the cold rolling step, and the finish-annealing step are sequentially performed on a steel ingot having a chemical composition comprising, in mass %,
C: 0.0020 to 0.0060%,
Si: 3.5 to 4.9%,
Mn: 0.05 to 0.19%,
Al: 0.05 to 0.45%,
P: 0.030% or less,
S: 0.0030% or less,
N: 0.0030% or less,
O: less than 0.0050%,
Ca: less than 0.0010%,
Ti: less than 0.0050%,
Nb: less than 0.0050%,
Zr: less than 0.0050%,
V: less than 0.0050%,
Cu: less than 0.20%,
Ni: less than 0.50%,
Sn: 0 to 0.05%, and
Sb: 0 to 0.05%,
a balance being Fe and impurities,
wherein the following Formula (i) is satisfied:

$$4.0 \leq Si+Al \leq 5.0 \qquad \text{Formula (i):}$$

wherein each element symbol in Formula (i) represents a content (mass %) of a corresponding element in the steel ingot.

10. The method of manufacturing the non-oriented electrical steel sheet according to claim 9,
further comprising a hot-rolled sheet annealing step between the hot rolling step and the cold rolling step.

11. The non-oriented electrical steel sheet according to claim 1,
wherein a magnetic flux density ($B_{50}$) is 1.60 T or more.

* * * * *